(12) United States Patent
Lin et al.

(10) Patent No.: US 11,553,310 B2
(45) Date of Patent: Jan. 10, 2023

(54) AGGREGATED POSITIONING SIGNAL PROCESSING MANAGEMENT

(71) Applicant: QUALCOMM Incorporated, San Diego, CA (US)

(72) Inventors: Yih-Hao Lin, San Diego, CA (US); Alexandros Manolakos, Escondido, CA (US); Lorenzo Ferrari, Oakland, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/323,566

(22) Filed: May 18, 2021

(65) Prior Publication Data

US 2021/0368297 A1  Nov. 25, 2021

Related U.S. Application Data

(60) Provisional application No. 63/027,999, filed on May 21, 2020.

(51) Int. Cl.
*H04W 4/029* (2018.01)
*G01S 5/10* (2006.01)
*G01S 5/02* (2010.01)
*H04L 5/00* (2006.01)

(52) U.S. Cl.
CPC ........... *H04W 4/029* (2018.02); *G01S 5/0236* (2013.01); *G01S 5/10* (2013.01); *H04L 5/0048* (2013.01)

(58) Field of Classification Search
CPC ....... H04W 4/029; H04W 4/14; H04W 64/00; G01S 5/0236; G01S 5/10; G01S 1/0428; G01S 5/01; H04L 5/0048
See application file for complete search history.

(56) References Cited

U.S. PATENT DOCUMENTS

| 2014/0221005 A1 | 8/2014 | Marshall et al. |
| 2019/0037338 A1 | 1/2019 | Edge et al. |

(Continued)

FOREIGN PATENT DOCUMENTS

WO   2019074435 A1   4/2019

OTHER PUBLICATIONS

International Search Report and Written Opinion—PCT/US2021/033043—ISA/EPO—dated Sep. 7, 2021.

(Continued)

*Primary Examiner* — Kabir A Timory
(74) *Attorney, Agent, or Firm* — Thien T. Nguyen

(57) ABSTRACT

A example method of determining a positioning signal measurement includes: sending, from a user equipment to a network entity, a processing-capability message indicating a processing capability of the user equipment for processing an aggregated positioning reference signal, where the processing-capability message corresponds to one or more assistance-data types; obtaining, at the user equipment, the aggregated positioning reference signal; and processing, at the user equipment, the aggregated positioning reference signal based on assistance data to determine the positioning signal measurement, the assistance data including the one or more assistance-data types.

42 Claims, 9 Drawing Sheets

(56) References Cited

U.S. PATENT DOCUMENTS

2019/0268725 A1     8/2019  Edge et al.
2020/0045667 A1*    2/2020  Modarres Razavi ........................
                                                        H04W 64/003

OTHER PUBLICATIONS

Thorpe M., et al., "LTE Location Based Services Technology Introduction White Paper Table of Contents OA Rohde & Schwarz LTE Location Based Services—Technology Introduction 2", Sep. 2013, 23 Pages, XP055192328, Apr. 1, 2013 (Apr. 1, 2013), Retrieved from the Internet: URL: http://www.rohde-schwarz.de/file/LTE_L.

* cited by examiner

| Assistance Data / Processing Capability | EPRE | Phase Offset | RTD | Expected RSTD / Expected RSTD Unc. |
|---|---|---|---|---|
| N1, T1, B1 | N/A | N/A | N/A | N/A |
| N2, T2, B2 | N/A | N/A | X | X |
| N3, T3, B3 | N/A | X | N/A | N/A |
| N4, T4, B4 | X | N/A | N/A | N/A |
| N5, T5, B5 | N/A | X | X | X |
| N6, T6, B6 | X | N/A | X | X |
| N7, T7, B7 | | | | |
| N8, T8, B8 | X | X | N/A | N/A |
| N9, T9, B9 | X | X | X | X |
| N10, T10, B10 | | | | |
| N11, T11, B11 | | | | |

FIG. 6

AGGREGATED POSITIONING SIGNAL PROCESSING MANAGEMENT

CROSS-REFERENCE TO RELATED APPLICATIONS

This application claims the benefit of U.S. Provisional Application No. 63/027,999, filed May 21, 2020, entitled "AGGREGATED POSITIONING SIGNAL PROCESSING MANAGEMENT," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment includes: at least one transceiver configured to transmit outbound signals wirelessly and receive inbound signals wirelessly; a memory; and at least one processor, communicatively coupled to the at least one transceiver and the memory, and configured to: send, to a network entity via the at least one transceiver, a processing-capability message indicating a processing capability of the user equipment for processing an aggregated positioning reference signal, where the processing-capability message corresponds to one or more assistance-data types; obtain the aggregated positioning reference signal from the at least one transceiver; and process the aggregated positioning reference signal based on assistance data to determine a positioning signal measurement, the assistance data including the one or more assistance-data types.

Another example user equipment includes: means for sending, to a network entity, a processing-capability message indicating a processing capability of the user equipment for processing an aggregated positioning reference signal, where the processing-capability message corresponds to one or more assistance-data types; means for obtaining the aggregated positioning reference signal; and means for processing the aggregated positioning reference signal based on assistance data to determine a positioning signal measurement, the assistance data including the one or more assistance-data types.

An example method of determining a positioning signal measurement includes: sending, from a user equipment to a network entity, a processing-capability message indicating a processing capability of the user equipment for processing an aggregated positioning reference signal, where the processing-capability message corresponds to one or more assistance-data types; obtaining, at the user equipment, the aggregated positioning reference signal; and processing, at the user equipment, the aggregated positioning reference signal based on assistance data to determine the positioning signal measurement, the assistance data including the one or more assistance-data types.

An example non-transitory, processor-readable storage medium includes processor-readable instructions configured to cause one or more processors of a user equipment to: send, from the user equipment to a network entity, a processing-capability message indicating a processing capability of the user equipment for processing an aggregated positioning reference signal, where the processing-capability message corresponds to one or more assistance-data types; obtain, at the user equipment, the aggregated positioning reference signal; and process, at the user equipment, the aggregated positioning reference signal based on assistance data to determine a positioning signal measurement, the assistance data including the one or more assistance-data types.

An example location server includes: at least one transceiver; a memory; and at least one processor, communicatively coupled to the at least one transceiver and the memory, and configured to: receive, via the at least one transceiver, a processing-capability message including one or more indications of processing capability of a user equipment for processing an aggregated positioning reference signal, where each of the one or more indications of processing capability corresponds to a respective indication of one or more assistance-data types; and transmit, via the at least one transceiver to the user equipment, assistance data information based on the processing-capability message.

Another example location server includes: means for receiving a processing-capability message including one or more indications of processing capability of a user equipment for processing an aggregated positioning reference signal, where each of the one or more indications of processing capability corresponds to a respective indication of one or more assistance-data types; and means for transmitting, to the user equipment, assistance data information based on the processing-capability message.

An example method for assisting a user equipment includes: receiving, at a location server from the user equipment, a processing-capability message including one or more indications of processing capability of the user equipment for processing an aggregated positioning reference signal, where each of the one or more indications of processing capability corresponds to a respective indication of one or more assistance-data types; and transmitting, from the location server to the user equipment, assistance data information based on the processing-capability message.

An example non-transitory, processor-readable storage medium includes processor-readable instructions configured to cause one or more processors of a location server to: receive, from a user equipment, a processing-capability message including one or more indications of processing capability of the user equipment for processing an aggregated positioning reference signal, where each of the one or more indications of processing capability corresponds to a respective indication of one or more first assistance-data types; and transmit, to the user equipment, assistance data information based on the processing-capability message.

BRIEF DESCRIPTION OF THE DRAWINGS

FIG. 6 is an example table of processing capabilities and associated assistance-data availabilities.

DETAILED DESCRIPTION

Figure 1:
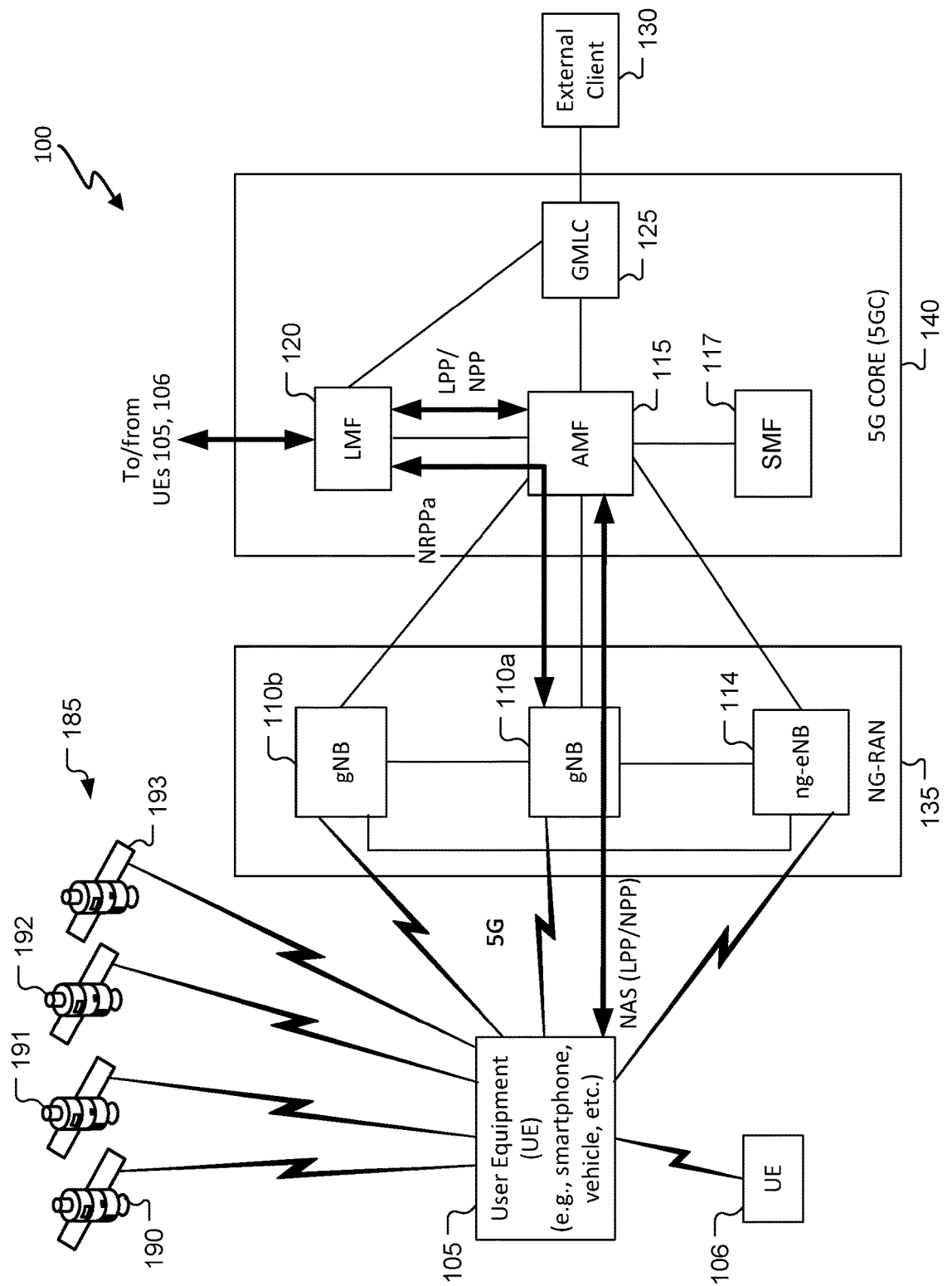
FIG. 1 is a simplified diagram of an example wireless communications system.

Techniques are discussed herein for managing positioning signal processing. For example, a user equipment may provide one or more indications of processing capability of the user equipment for processing positioning reference signals. Processing capabilities may be indicated for different assistance-data availabilities or different subsets of assistance data, e.g., different availabilities of one or more assistance-data types, e.g., combinations of types of available assistance data, lack of available assistance data (i.e., an availability being unavailable), or availability of one type of assistance data or another, or value(s) of assistance data. The assistance data may be used by the user equipment to process a positioning reference signal to determine a positioning signal measurement that is used to determine a position of the user equipment. A server may provide assistance data to the user equipment and/or coordinate a positioning schedule, e.g., an update rate for position determination of the user equipment, based on the available assistance data and the indicated processing capability(ies) of the user equipment. These are examples, and other examples may be implemented.

Items and/or techniques described herein may provide one or more of the following capabilities, as well as other capabilities not mentioned. Time to determine position information (e.g., positioning signal measurements, processed positioning signal measurements (e.g., ranges), and/or location estimates) may be reduced. Mobile device position determination accuracy may be increased, e.g., lateral (horizontal) and/or vertical (altitude) position. Latency in determining positioning signal measurements and mobile device position may be reduced. Position scheduling accuracy may be increased. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least sometimes using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
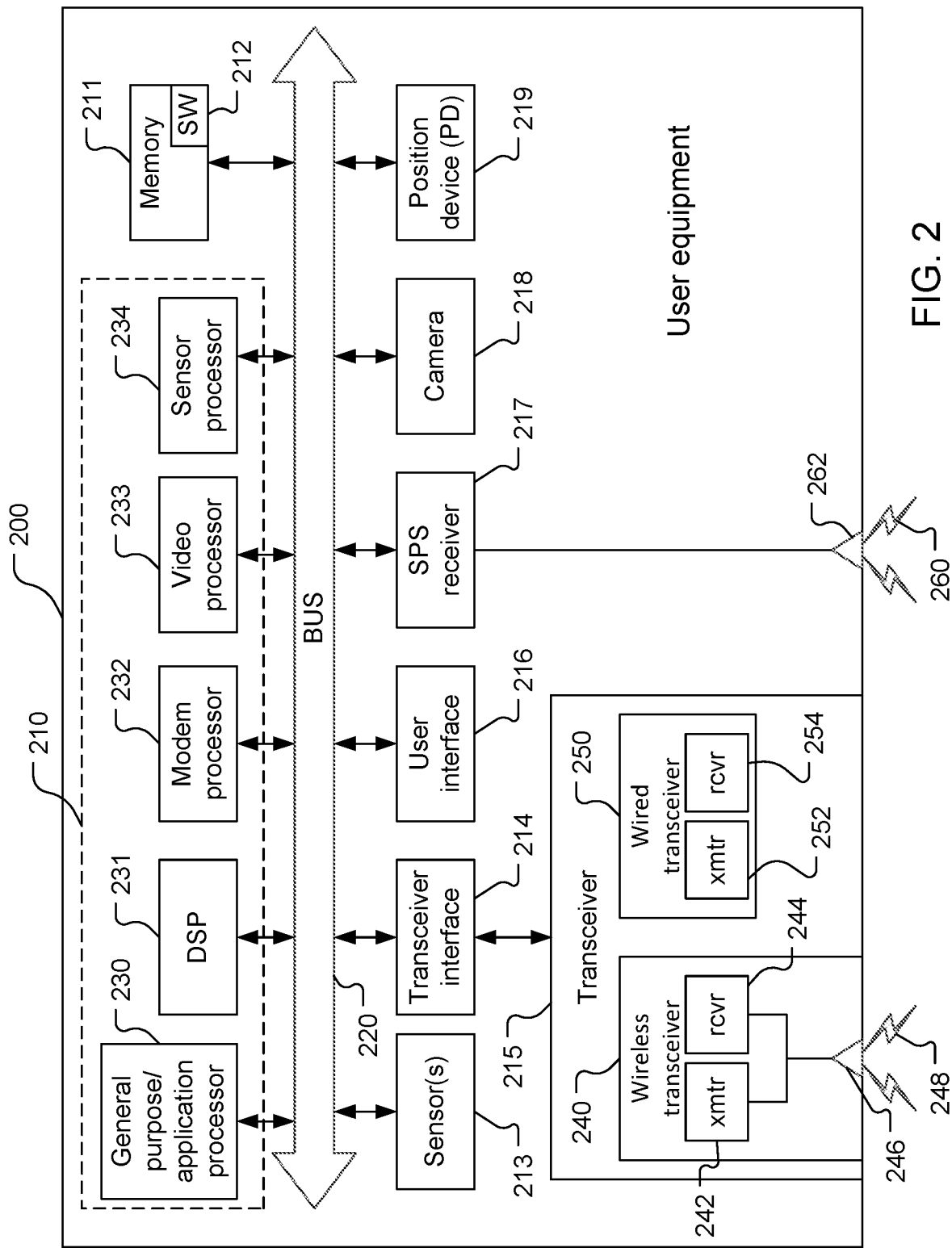
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
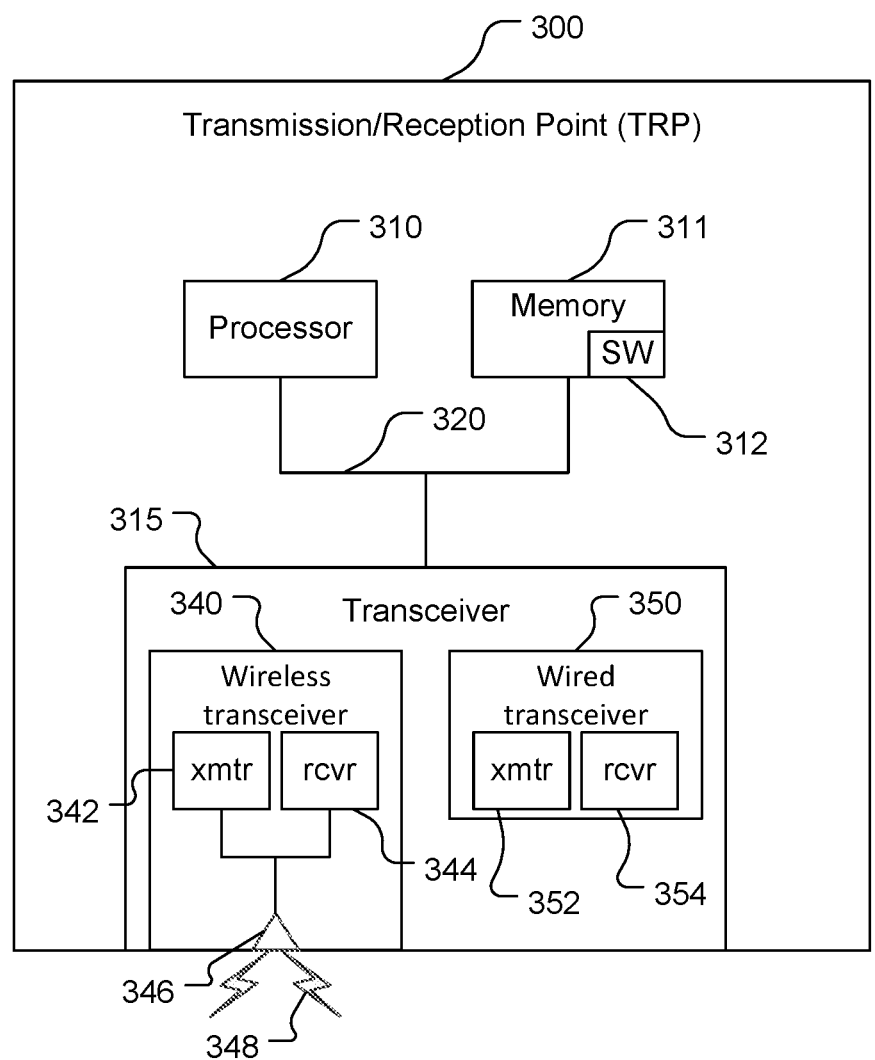
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
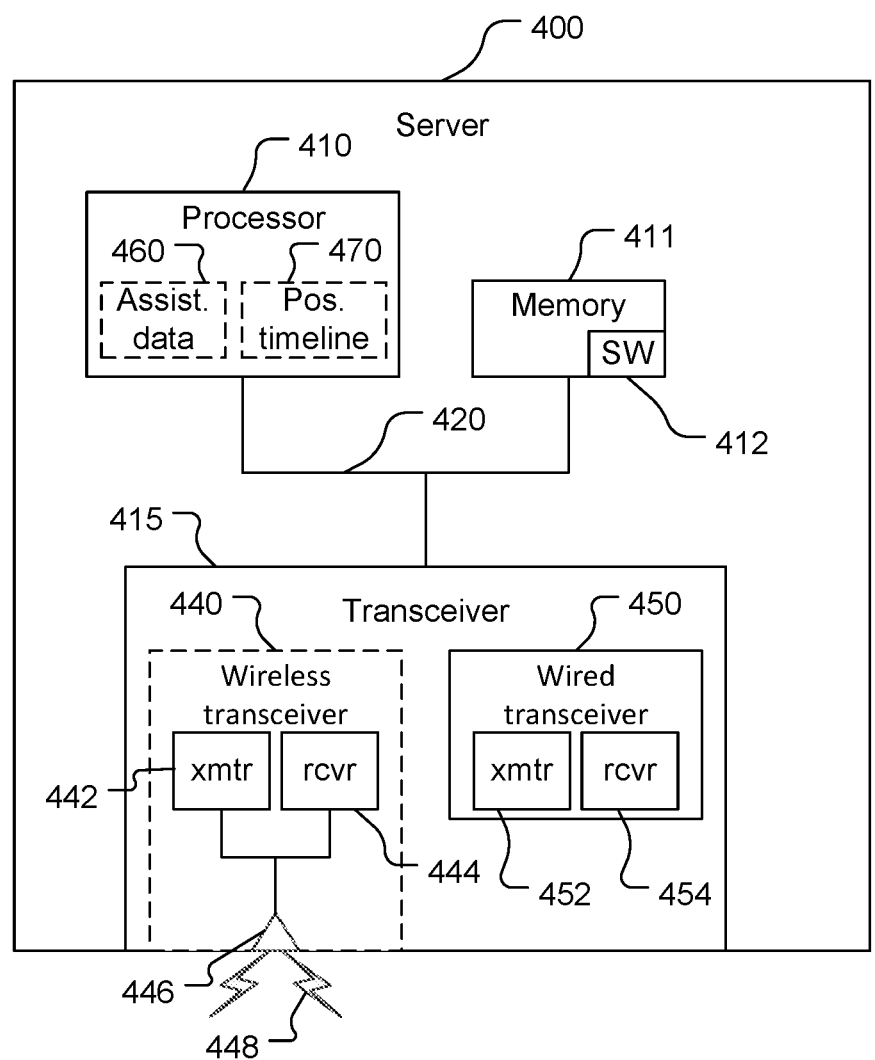
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Assistance-Data-Dependent Processing Capability

Availability of assistance data (i.e., data that may be used to help determine a positioning measurement) may affect determination of positioning information, e.g., may affect time to determine a positioning measurement and/or accuracy of the measurement. Joint processing across PRS components may be used to obtain ToA estimates, which may help provide high-precision positioning service (e.g., location determination within 30 cm accuracy), especially in challenging environments such as indoors. An aggregated PRS is a collection of PRS resources transmitted from the same TRP such that it may be assumed that the same antenna port is used to transmit the PRS resources, with each PRS resource of an aggregated PRS being called a PRS component. Each PRS component may have different energy per resource element (EPRE), phase offset, and/or real time difference (RTD) (especially if PRS components are associated with different RF chains). Phase offsets may be due to different component carriers being produced by different devices (e.g., different phase-locked loops) such that different PRS components of different component carriers may be offset in phase. The RTD provides a difference in timing relative to a time reference, e.g., a reference base station time or a synchronized time. The RTD and phase offset may be referred to as coherence parameters. The differences in EPRE, phase offset, and/or RTD between PRS components may inhibit PRS stitching. For example, without calibrating/compensating for one or more of such differences, the different PRS components may appear as shifted versions (or different scaled versions) of each other and inhibit measurement calculations of multiple PRS components, e.g., making the calculations more difficult and/or making use of more complex algorithms likely in order to achieve desired accuracy, and thus using more processing power and/or time to determine the measurements. A complexity and/or accuracy of PRS measurement algorithm, e.g., a ToA estimation algorithm, may depend on availability of assistance data, e.g., for calibrating EPRE, phase offset, and/or RTD across PRS components. Available assistance data may be used to determine a measurement using an algorithm (e.g., a time-domain peak detection algorithm for determining a ToA estimate) that incurs lower processing delay than a more sophisticated/complex algorithm used where assistance data are not available.

A UE may provide information regarding processing capability of the UE (and/or other entity) for processing PRS to determine a positioning signal measurement. The UE may provide one or more indications of processing capability of an entity (e.g., the UE, another UE, and/or a network entity such as the server 400) to determine positioning signal measurements. The UE may provide one or more processing capabilities based on assistance data availability. For example, the UE may provide indications of multiple processing capabilities for corresponding assistance data, e.g., available assistance-data types. The UE may provide multiple processing capabilities for a single assistance-data type or a single combination of assistance-data types, e.g., for positioning signals of different frequencies bands (e.g., different component carriers). The UE may provide processing capabilities corresponding to different subsets of assistance data, e.g., different assistance-data types and/or different combinations of assistance-data types. A network entity such as the LMF 120 may use the processing capability(ies) indicated by the UE and information as to the available assistance data to determine a timeline of position information availability (e.g., including an update rate, and/or update period for the UE, and/or a timing of one or more position-dependent actions).

Figure 5:
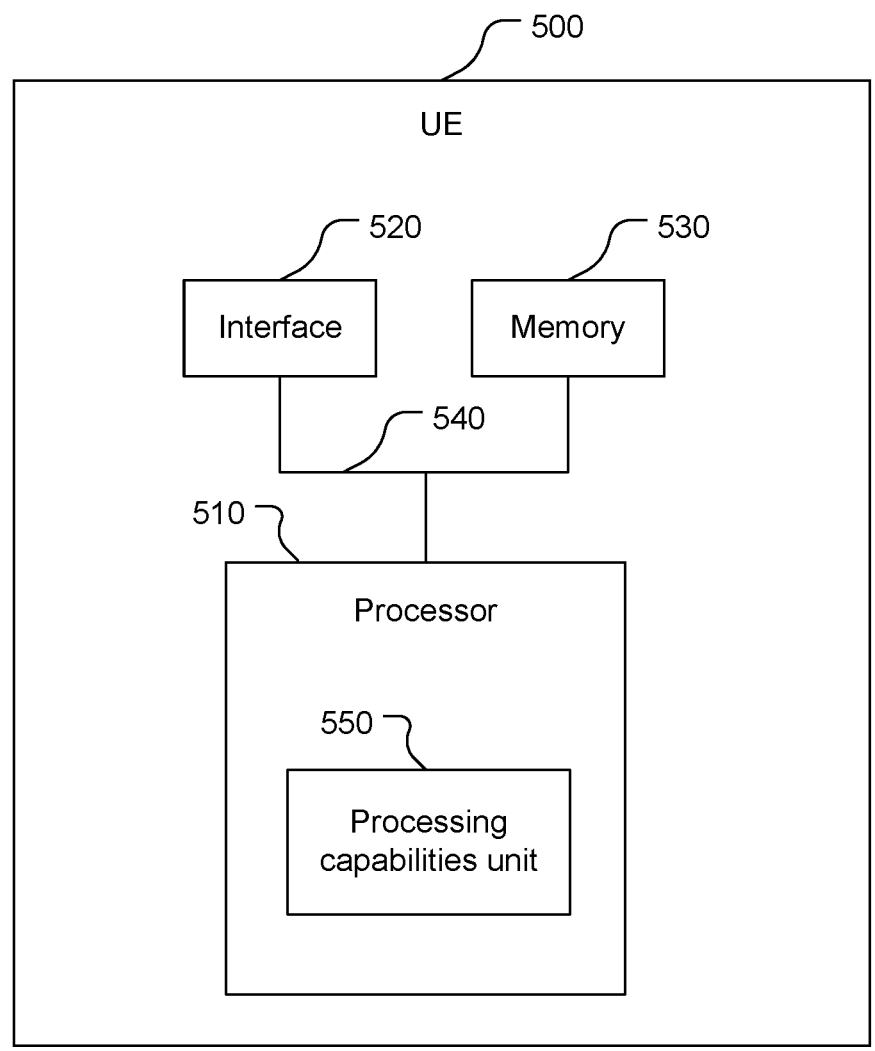
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer to the processor 510 alone performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a processing capabilities unit 550 configured to report one or more processing capabilities of the UE 500, and to implement an appropriate processing capability depending upon available assistance data, as discussed herein. The processing capabilities unit 550 is discussed further below, and the description may refer to the processor 510 generally, or the UE 500 generally, as performing any of the functions of the processing capabilities unit 550.

Referring also to FIG. 6, the processing capabilities unit 550 may be configured to provide processing capabilities corresponding to one or more assistance-data availabilities. For example, the processing capabilities unit 550 may be configured to provide a table 600 of processing capabilities and associated available assistance data. The processing capabilities may be dependent upon the assistance-data availability, e.g., the one or more types of available assistance data or the lack of available assistance data. The availability of assistance data may allow the UE 500 (or another entity) to process raw positioning signal data of one or more PRS received by the UE 500 using a less complex and/or more accurate algorithm to determine a positioning signal measurement than if assistance data are not available. The algorithm that may be used may depend on the particular type(s) of assistance data that are available. Generally, the more assistance-data types that are available, the less complex and more accurate the algorithm may be, and the less time will be used to process a raw positioning signal into a positioning signal measurement. The table 600 includes processing-capability sets 610 of processing-capability parameters indicative of characteristics of processing a PRS into a positioning signal measurement. Each of the processing-capability sets 610 corresponds to an assistance data set 620, although, as shown, the same assistance-data set may correspond to more than one processing-capability set 610.

The processing capabilities unit 550 may be configured to provide processing capabilities of a variety of processing-capability parameters and/or to associate processing-capability parameters with a variety of aggregated PRS assistance-data availabilities of one or more assistance-data types. For example, the processing capabilities unit 550 may be configured to provide processing-capability set 630, 631, 632, 633, 634, 635, 636, 637, 638, 639, 640 of processing-capability parameters. The processing-capability parameters include a duration (N) of PRS symbols that may be processed in an indicated timeframe (T), and may include a specified maximum frequency bandwidth (B) for the PRS symbols. Also in this example, the processing capabilities unit 550 provides the processing-capability sets 630-640 corresponding to respective assistance-data availabilities that in this example comprise combinations of indications of availability of aggregated PRS assistance-data types 660, here, assistance-data sets 650, 651, 652, 653, 654, 655, 656, 657 of aggregated PRS assistance-data types of EPRE, phase offset, RTD, and expected RSTD and/or expected RSTD uncertainty. Each assistance-data set 650-657 may correspond to a frequency layer or a subset of a frequency layer. The assistance data comprise calibration data that may be used to compensate for differences between PRS components such that the PRS components may be stitched.

The table 600 is an example, and not limiting of the disclosure. For example, one or more assistance-data availabilities and corresponding processing capabilities may be provided. As another example, the timeframe T may not be indicated in the processing-capability sets 630-640, e.g., if the timeframe is agreed upon. As another example, the processing capabilities unit 550 may be configured to report a number of PRS resources that the UE 500 can process in a slot, which may be reported per SCS per band. A value of this parameter that may be indicated may be limited to a set of possible values such as 1, 2, 4, 8, 12, 16, 32, or 64. As another example, the processing capabilities unit 550 may provide, as part of the processing capabilities, an indication of what quality of processing can be performed, e.g., what error rate and/or accuracy may be achieved for a determined positioning signal measurement. Different accuracies may be provided for different bandwidths of the processing capabilities (e.g., 2.5 ns ToA error with a 100 MHz bandwidth, 1.2 ns with a 200 MHz bandwidth, and 0.7 ns with a 400 MHz bandwidth). As another example, one or more of the assistance-data types 660 may be omitted and/or one or more other types of assistance data may be provided. For example, a single assistance-data type may be available. As another example, the assistance-data types may be coded, e.g., with each bit in a series of bits corresponding to an assistance-data type, with each assistance-data type agreed to, and each location in the series corresponding to an agreed-upon assistance-data type. For example, a series of 0011 may correspond to the assistance-data set 651 where EPRE and phase offset are not available (N/A) and RTD and expected RSTD/expected RSTD uncertainty are available. The assistance data may be implied, e.g., based on a location of the processing capability information, e.g., the processing-capability set, in a message.

Each of the processing capabilities, in table 600 the processing-capability sets 630-640, corresponds to a respective processing algorithm (e.g., supported by the UE and/or other entity) for processing a (DL) PRS to determine a positioning signal measurement such as ToA. The indicated processing capabilities are enabled by the respective processing algorithms and the processing algorithms use the assistance data corresponding to the indicated processing capabilities. An algorithm that corresponds to a processing capability that corresponds to EPRE, phase offset, and RTD assistance data being available may be faster than an algorithm configured to operate without EPRE, phase offset, and RTD assistance data being provided. Each processing capability corresponds to a latency, and different processing capabilities may correspond to different latencies.

The processing-capability parameters may take various forms and have various values. For example, the duration N and the timeframe T may be specified in milliseconds, and the bandwidth B specified in MHz, such that the duration N may be the duration in milliseconds of PRS symbols that may be processed in T ms for a maximum bandwidth of B MHz. The maximum bandwidth B may be a limit of the bandwidth of the aggregated PRS. The value of the duration N that may be indicated may be limited to a set of possible values such as 0.125 ms, 0.25 ms, 0.5 ms, 1 ms, 2 ms, 4 ms, 8 ms, 12 ms, 16 ms, 20 ms, 25 ms, 30 ms, 35 ms, 40 ms, 45 ms, or 50 ms, or other value. The value of the timeframe T that may be indicated may be limited to a set of possible values such as 8 ms, 16 ms, 20 ms, 30 ms, 40 ms, 80 ms, 160 ms, 320 ms, 640 ms, or 1280 ms, or other value. The value of the bandwidth B that may be indicated may be limited to a set of possible values such as 5 MHz, 10 MHz, 20 MHz, 40 MHz, 50 MHz, 80 MHz, 100 MHz, 200 MHz, or 400 MHz, or other value. The units of the parameters N, T, and/or B may not be specified, e.g., if implicit (e.g., agreed upon). The combination of values for N and T may not be dependent on SCS. The UE processing capability for DL PRS may be defined in a variety of manners, e.g., by assuming one or more operating conditions. For example, the capability may be defined assuming that the UE is configured with a measurement gap and that a ratio of measurement gap length (MGL) to a measurement gap repetition period (MGRP) is no more than a specified threshold value.

Referring again to FIG. 4, with further reference to FIG. 5, the processor 410 (possibly in conjunction with the memory 411 and, as appropriate, (one or more portions of) the transceiver 415) includes an assistance data unit 460 and a positioning timeline unit 470. The assistance data unit 460 is configured to determine what assistance data, e.g., what assistance-data types, are provided to the UE 500 (e.g., by the TRP 300 and/or the server 400). The positioning timeline unit 470 is configured to determine positioning timeline information such as an update rate of position information (e.g., one or more position measurements of one or more positioning signals received by the UE 500, or location of the UE 500). The positioning timeline unit 470 may be configured to determine the positioning timeline information based on a processing capability corresponding to the available assistance data (e.g., available to the UE 500 and/or other entity), and possibly a bandwidth of the positioning signal received by the UE 500 (and/or other entity). The assistance data unit 460 and the positioning timeline unit 470 are discussed further below, and the description may refer to the processor 410 generally, or the server 400 generally, as performing any of the functions of the assistance data unit 460 and the positioning timeline unit 470.

Figure 7:
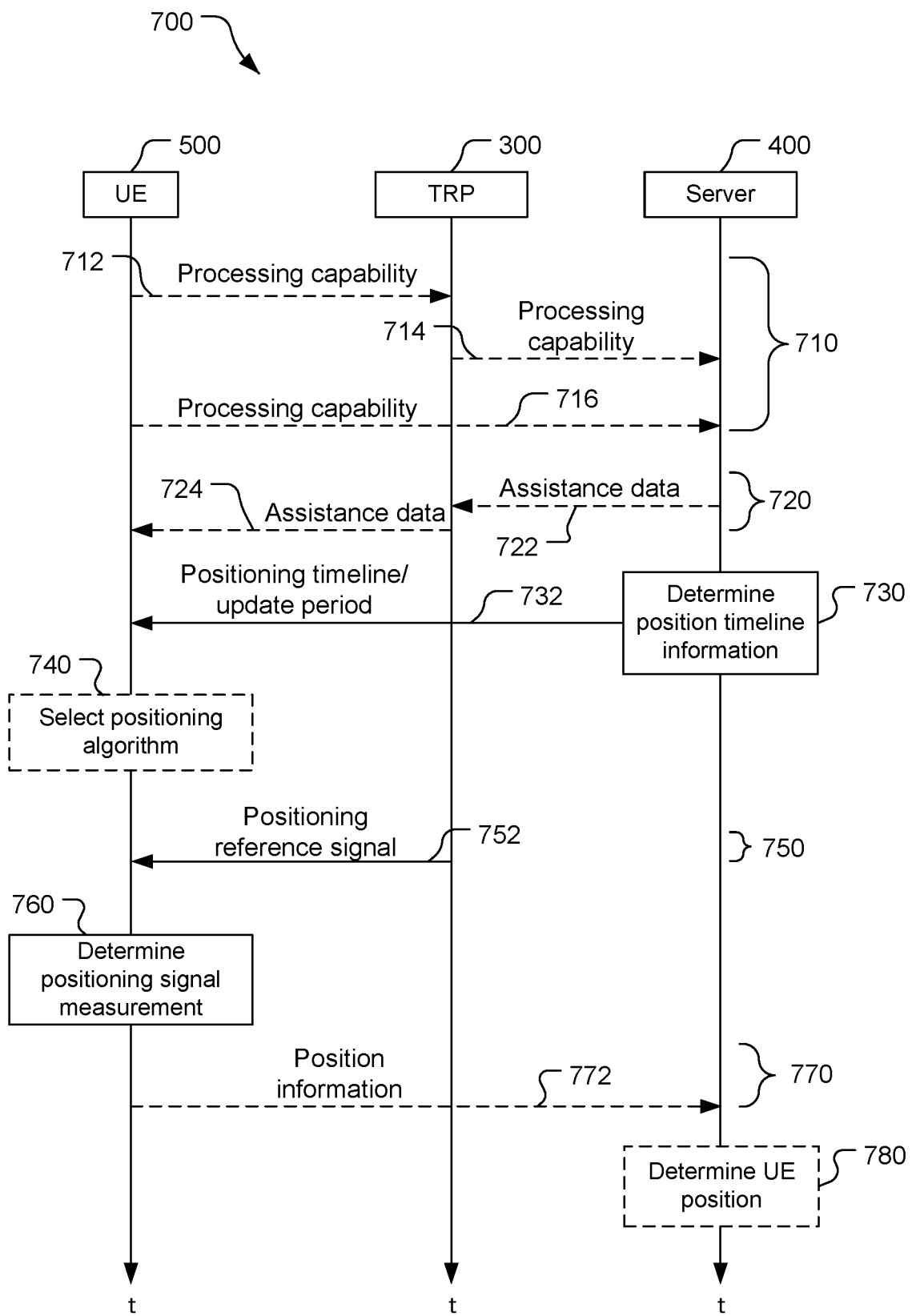
FIG. 7 is a signaling and process flow for providing processing capability, possibly providing assistance data, and determining positioning timeline information.

Referring to FIG. 7, with further reference to FIGS. 1-5, a signaling and process flow 700 for providing processing capability, possibly providing assistance data, and determining positioning timeline information includes the stages shown. The flow 700 is an example, as stages may be added, rearranged, and/or removed, stages performed by one or more entities other than those shown, performed by combinations of two or more of the entities shown, etc.

At stage 710, the UE 500 sends one or more indications of one or more processing capabilities of the UE 500. For example, the processing capabilities unit 550 may send the table 600 or other forms of indications of the processing capability(ies) of the UE 500. As another example, the processing capabilities unit 550 may send a single PRS processing capability under an assumption that specific aggregated PRS assistance data will be available and provided. The UE 500 may send the one or more indications of the one or more processing capabilities to the TRP 300 in a processing capability message 712 and/or to the server 400 in a processing capability message 716. If the UE 500 sends the message 712, then the TRP 300 may send the one or more indications of the one or more processing capabilities to the server 400 in a processing capability message 714. Although each of the messages 712, 716 is optional, the UE 500 will send at least one of the messages 712, 716 and/or another message such that the server 400 is informed of the processing capability(ies) of the UE 500. The UE 500 may send the message(s) 712, 716 (and/or one or more other messages) intermittently (e.g., periodically at regular intervals) or in response to a trigger (e.g., a change in capabilities, a change in the serving TRP, a change in a serving server, etc.).

At stage 720, the server 400 may send assistance data to the UE 500 via the TRP 300 in assistance data messages 722, 724 (and/or directly to the UE 500) and may store, in the memory 411, the assistance data and/or indications of assistance-data types of the assistance data. For example, the processor 410 may obtain indications of EPRE and/or phase offset from the TRP 300 (e.g., from transmit power and phase measurements at the TRP 300) and determine the EPRE assistance data and/or the phase offset assistance data using this information. As another example, the processor 410 may determine RTD assistance data by analyzing timing information of PRS component transmissions from the TRP 300 compared to a timing reference. As another example, the processor 410 may determine expected RSTD assistance data and/or expected RSTD uncertainty assistance data using a coarse location of the UE 500 (e.g., using E-CID) and a known location of a reference signal source.

At stage 730, the server 400 determines positioning timeline information. For example, the positioning timeline unit 470 may be configured to use information from the assistance data unit 460 to determine what, if any, aggregated PRS assistance data (assistance data for processing PRS components) are/will be provided to the UE 500, and possibly what bandwidth of positioning signal will be provided to the UE 500 to determine the corresponding processing capability(ies). For example, the assistance data unit 460 may determine which assistance-data types, if any, are available for the PRS components to be sent to the UE 500. The positioning timeline unit 470 may, for example, use the table 600 as a look-up table to find the assistance-data set of the assistance-data sets 650-657 that indicates availability of the assistance-data types that will be provided (e.g., by the server 400) to the UE 500, and determine the corresponding processing capability(ies). In this example, the assistance data set 650 indicates that the availability of each of the assistance-data types in the assistance data set 620 is unavailable and each of the assistance-data sets 651-657 indicates that at least one of the assistance-data types is available. The positioning timeline unit 470 may be configured to use further information, e.g., positioning signal bandwidth, to disambiguate between multiple processing capabilities corresponding to a single one of the assistance-data sets 650-657. The positioning timeline unit 470 may use processing-capability parameters of the positioning capability (corresponding to the assistance data to be provided) to determine, for example, an update rate for positioning for the UE 500, e.g., by dividing the number of symbols to be processed (to determine a positioning signal measurement) by the duration N of the selected processing capability, and multiplying this value by the timeframe T of the selected processing-capability set. The server 400 may transmit a positioning timeline/update period message 732 to the UE 500 to configure (e.g., instruct) the UE 500 to implement the determined update period (e.g., frequency of reporting position). The processing capabilities may be faster as more assistance data are available. Thus, the positioning timeline unit 470 may, for example, schedule an aggressive update rate if all assistance-data types are available, a moderate update rate (slower than the aggressive update rate) if a partial list of assistance-data types is available, and a conservative update rate (slower than the moderate update rate) if no assistance data are available. For example, an aggressive update rate may be about 10 ms, a moderate update rate may be tens of milliseconds such as about 50 ms, and a conservative update rate may be about 100 ms, but these values are examples and not limiting of the disclosure. The positioning timeline unit 470 may use one or more other pieces of information to determine the update rate, e.g., another processing capability corresponding to another TRP. The positioning timeline unit 470 may be configured to determine other positioning timeline information such as timing for triggering a location-based service.

At stage 740, the UE 500 may select a technique, e.g., a positioning algorithm, for determining a positioning signal measurement. For example, the processing capabilities unit 550 may determine the positioning algorithm that corresponds to the assistance data provided at stage 720. The processing capabilities unit 550 may use additional information, e.g., a bandwidth of an aggregated PRS to be sent to the UE 500, to determine the positioning algorithm to be used to determine the positioning signal measurement from a received PRS component. For example, if the assistance data message 724 that the UE 500 receives includes the assistance-data set 657, then the UE 500 may determine whether a bandwidth of an aggregated PRS to be received by the UE 500 is within a maximum frequency bandwidth B9, maximum frequency bandwidth B10, or a maximum frequency bandwidth B11 and select the positioning algorithm corresponding to the processing-capability set 638-640 with the smallest maximum frequency bandwidth that includes the frequency bandwidth of the aggregated PRS to be received (or actually received if stage 740 is performed after stage 750). If no assistance data are provided to the UE 500, e.g., no assistance data message is received by the UE 500 or the assistance data message 724 does not include assistance data (e.g., indicates that no assistance data are available), then the UE 500 may use (e.g., select) a default positioning algorithm for determining a positioning signal measurement. The default positioning algorithm may not use any value of assistance data or may use one or more default values for assistance data. Performance of the default positioning algorithm may take longer and/or yield less accurate results than if assistance data are provided, e.g., assistance data that help compensate for one or more PRS component differences, e.g., inform the UE 500 of the difference(s) such that the UE 500 may adjust to the difference(s) such that the PRS components appear to be from the same antenna port. The default positioning algorithm may provide a lowest processing capability that the UE 500 can support.

At stage 750, the UE 500 receives a positioning reference signal. In this example, the TRP 300 sends an aggregated PRS in a positioning reference signal message 752 to the UE 500. In another example, another aggregated positioning reference signal may be received by the UE 500, e.g., an SRS for positioning from another UE.

At stage 760, the UE 500 determines a positioning signal measurement. For example, the processor 510 may process the received aggregated positioning reference signal using the positioning algorithm selected (perhaps by default) at stage 740. Performance of the positioning algorithm may yield a positioning signal measurement such as ToA, RSRP, RSRQ, or RSSI, etc. The UE 500 may also determine a position (i.e., location) of the UE 500 using the positioning signal measurement, e.g., to determine a pseudorange that the processor 510 uses in combination with one or more other pseudoranges and known locations of positioning signal sources to determine the position of the UE 500. Also or alternatively, the raw positioning signal information may be provided by the UE 500 to another entity, e.g., the server 400, for determination of the positioning signal measurement. The UE 500 may apply (e.g., the processor 510 is configured to apply) respective calibration parameters of the assistance data to each PRS component of the aggregated positioning reference signal such that different PRS components may have different calibration parameter values applied.

At stage 770, the UE 500 may send position information to the server 400 in a position information message 772. The position information message 772 may include raw signal information and/or processed positioning signal information such as a positioning reference signal measurement and/or a position of the UE 500. The determined position of the UE 500 may be called a position estimate.

At stage 780, the server 400 may determine the position of the UE 500. The server 400 may collect position information from multiple position information messages 772 and perform one or more positioning techniques to determine the location of the UE 500. The server 400 may use position information from the message 772 to update a previously-determined position for the UE 500.

Figure 8:
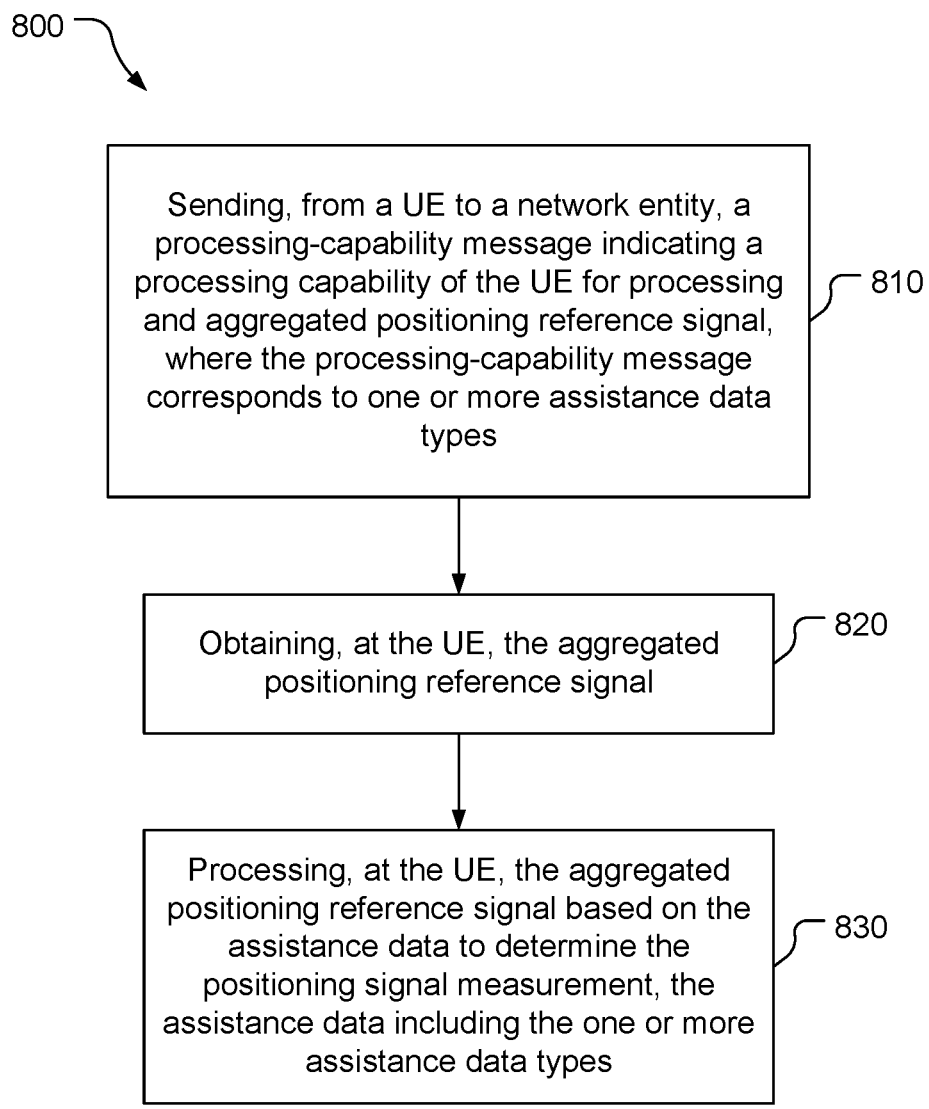
FIG. 8 is a block flow diagram of a method of determining a positioning signal measurement.

Referring to FIG. 8, with further reference to FIGS. 1-7, a method 800 of determining a positioning signal measurement includes the stages shown. The method 800 is, however, an example and not limiting. The method 800 may be altered, e.g., by having stages added, removed, rearranged, combined, performed concurrently, and/or having single stages split into multiple stages.

At stage 810, the method 800 includes sending, from a user equipment to a network entity, a processing-capability message indicating a processing capability of the user equipment for processing an aggregated positioning reference signal, wherein the processing-capability message corresponds to one or more assistance-data types. For example, the processing capabilities unit 550 may send one or more processing capabilities (each including one or more processing-capability parameters) to a network entity such as the TRP 300 in the message 712 and/or to the server 400 in the message 716. The processing capability may implicitly correspond to one or more assistance-data types, e.g., being assumed (e.g., agreed upon) to correspond to the one or more assistance-data types. The message 712, 716 may include an assistance-data-type message that includes one or more indications of the one or more assistance-data types.

The assistance-data-type message may be explicit, indicating the assistance-data type, or may be partially implicit and partially explicit (e.g., having one or more bits that are agreed upon to correspond to one or more respective assistance-data types). The processing capability may include more than one processing capability. For example, the processing capabilities unit 550 may send multiple processing capabilities with indications of respective corresponding assistance data to be provided for the UE 500 to provide the indicated processing capabilities. For example, the processing capabilities unit 550 may send the table 600 to the TRP 300 and/or to the server 400. The one or more assistance-data types may be types of calibration data for compensating for PRS components of an aggregated PRS that have one or more different characteristic values (e.g., values of EPRE, phase offset, RTD, expected RSTD, expected RSTD uncertainty, etc.) to help the UE 500 (or other entity) process the PRS components as though the PRS components are from the same antenna port. The processor 510, possibly in combination with the memory 530, and the interface 520 (e.g., the wireless transmitter 242 and the antenna 246) may comprise means for sending the processing-capability message.

At stage 820, the method 800 includes obtaining, at the user equipment, the aggregated positioning reference signal. For example, the UE 500 may receive an aggregated PRS at stage 750 in the positioning reference signal message 752. The aggregated PRS contains multiple PRS components that may have different values of signal characteristics (e.g., EPRE, phase offset, RTD, expected RSTD, expected RSTD uncertainty, etc.). The processor 510, possibly in combination with the memory 530, and the interface 520 (e.g., the wireless receiver 244 and the antenna 246) may comprise means for obtaining the aggregated positioning reference signal.

At stage 830, the method 800 includes processing, at the user equipment, the aggregated positioning reference signal based on the assistance data to determine the positioning signal measurement, the assistance data including the one or more assistance-data types. The assistance data may a value of an EPRE, a phase offset, an RTD, an expected RSTD, and/or an expected RSTD uncertainty (e.g., one of these or a combination of multiple (e.g., two or more) pieces of such information) for calibrating one or more PRS components. The UE 500, e.g., the processor 510, may process the positioning reference signal to determine a positioning signal measurement, e.g., a ToA. The processor 510, possibly in combination with the memory 530, may comprise means for processing the aggregated positioning reference signal.

Implementations of the method 800 may include one or more of the following features. In an example implementation, the method 800 may include obtaining the assistance data and selecting, based on the one or more assistance-data types of the assistance data, an algorithm of a plurality of algorithms, and processing the aggregated positioning reference signal comprises processing the aggregated positioning reference signal in accordance with the algorithm, of the plurality of algorithms, using the assistance data to determine the positioning signal measurement. For example, the processor 510 may receive the assistance data from the interface 520 (e.g., in the message 724 or from the memory 530 in response to receiving a coded indication of the assistance data). The processor 510 may use the assistance data to determine a corresponding algorithm, e.g., an algorithm that can use all of the assistance data obtained, select that algorithm, and use that algorithm to process the PRS to determine the positioning signal measurement. In another example implementation, the algorithm, of the plurality of algorithms, may be selected based further on a frequency bandwidth of the aggregated positioning reference signal. For example, as a single assistance-data availability may correspond to multiple different processing capabilities, the processor 510 may use a frequency bandwidth of the aggregated PRS to determine which of the multiple processing capabilities, and thus which corresponding algorithm, to select for processing the aggregated PRS. The processor 510 may, for example, choose the algorithm corresponding to the processing capability with the smallest maximum bandwidth that includes the bandwidth of the aggregated PRS. The processor 510 and the interface 520, and possibly the memory 530, may comprise means for obtaining the assistance data and the processor 510, and possibly the memory 530, may comprise means for selecting an algorithm.

Also or alternatively, implementations of the method 800 may include one or more of the following features. In an example implementation, the processing-capability message may indicate one or more processing capability sets each corresponding to a respective indication of assistance-data availability. For example, as shown in the table 600, each processing-capability set 630-640 corresponds to an indication of assistance-data availability, in the table 600 each indication of availability being one of the assistance-data sets 650-657, although multiple processing capability sets may correspond to a single indication of assistance-data availability (e.g., the processing-capability sets 638-640 correspond to the assistance-data set 657). In another example implementation, each of the one or more processing capability sets may include a set of processing-capability parameters. Each set of processing-capability parameters may, for example, include a timeframe, a bandwidth, and a time duration of positioning reference signal symbols of the bandwidth that the processor can process in the timeframe to determine the positioning signal measurement. The positioning signal measurement may not be determined in the timeframe, but the symbols are processed for eventual determination of the positioning signal measurement. The processing may include a wideband channel measurement for deriving a channel impulse response. In another example implementation, the processing-capability message may include a measurement accuracy. For example, the processing capabilities unit 550 may include a measurement accuracy such as a time error associated with a ToA measurement.

Also or alternatively, implementations of the method 800 may include one or more of the following features. In an example implementation, processing the aggregated positioning reference signal may comprise applying at least one assistance data parameter of the assistance data to each positioning reference signal resource of the aggregated positioning reference signal to determine the positioning signal measurement. The processor 510 may, for example, apply an EPRE, a phase offset, or an RTD to each PRS resource of the aggregated PRS to determine, e.g., ToA. In another example implementation, the aggregated positioning reference signal is processed according to a default algorithm to determine the positioning signal measurement in response to the assistance data being unavailable. For example, the processor 510 may use a default algorithm to process the aggregated PRS if no assistance data message (e.g., the message 722) is received or if an assistance data message is received and indicates that the assistance-data availability is that no assistance data are available. The default algorithm may use a default value for one or more assistance-data parameters, or may use no initial value of one or more assistance-data parameters. In another example implementation, the method 800 includes receiving the assistance data at the UE from the network entity, where at least a portion of the assistance data corresponds to the processing capability of the UE. The assistance data may include the available assistance-data type(s) corresponding to the processing capability and other assistance data (e.g., comb number, repetition factor, etc.) to be used by the UE 500 to measure PRS. The processor 510, possibly in combination with the memory 530, in combination with the interface 520 (e.g., the wireless receiver 244 and the antenna 246) may comprise means for receiving the assistance data.

Figure 9:
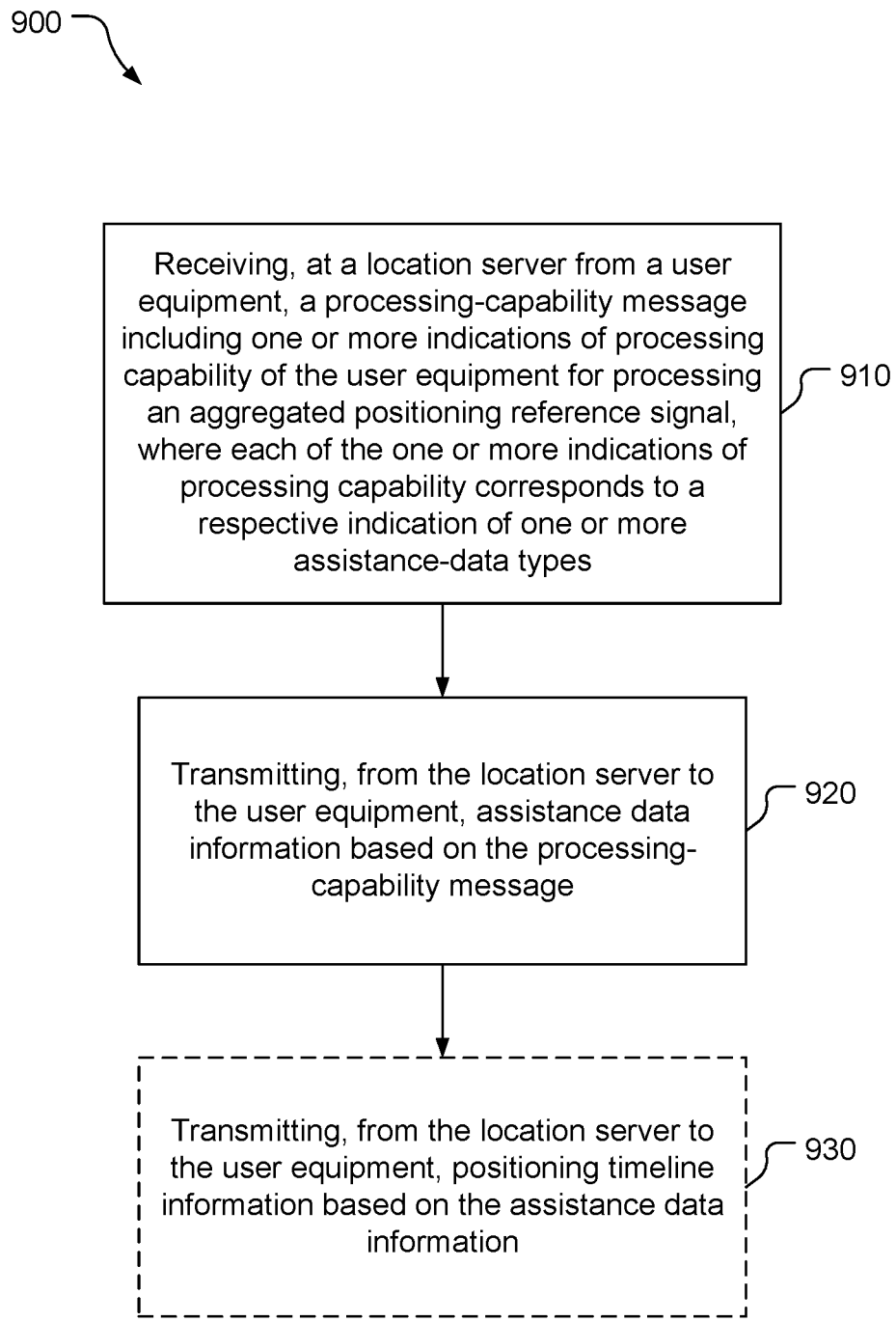
FIG. 9 is a block flow diagram of a method for assisting a user equipment.

Referring to FIG. 9, with further reference to FIGS. 1-7, a method 900 for assisting a UE includes the stages shown. The method 900 is, however, an example and not limiting. The method 900 may be altered, e.g., by having stages added, removed, rearranged, combined, performed concurrently, and/or having single stages split into multiple stages. For example, stage 930 may be omitted from the method 900.

At stage 910, the method 900 includes receiving, at a location server from the user equipment, a processing-capability message including one or more indications of processing capability of the user equipment for processing an aggregated positioning reference signal, where each of the one or more indications of processing capability corresponds to a respective indication of one or more assistance-data types. For example, the server 400 may receive at least one of the processing capability messages 714, 716 indicating one or more processing capabilities of the UE 500 and the availability of one or more assistance-data types used by the UE 500 to provide the indicated processing capability. The message 714, 716 may, for example, include the table 600 or a table including similar (or more) information (e.g., more processing capabilities corresponding to more assistance-data availabilities). The transceiver 415 (e.g., the wired transceiver 450 and/or the wireless transceiver 440 (e.g., the wireless receiver 444 and the antenna 446)), the processor 410, and possibly the memory 411, may comprise means for receiving the processing-capability message.

At stage 920, the method 900 includes transmitting, from the location server to the user equipment, assistance data information based on the processing-capability message. For example, the assistance data unit 460 may retrieve (e.g., from the memory 530) or determine information that indicates what assistance-data types that the TRP 300 will provide to the UE 500 for use by the UE 500 in processing an aggregated PRS to determine a positioning signal measurement. The information retrieved or determined by the assistance data unit 460 may be the assistance data. The assistance data unit 460 may transmit the retrieved or determined information to the UE 500. The processor 410, and possibly the memory 411, in combination with the transceiver 415 (e.g., the wired transmitter 452 and/or the wireless transmitter 442 and the antenna 446) may comprise means for transmitting the assistance data information.

Implementations of the method 900 may include one or more of the following features. In an example implementation, at stage 930, the method 900 includes transmitting, from the location server to the user equipment, positioning timeline information based on the assistance data information. For example, the positioning timeline unit 470 may determine the positioning timeline information based on what processing capability the UE 500 will provide as determined by the processor 410 based on the assistance-data type(s) corresponding to the processing capability(ies) provided by the UE 500 and the assistance data type(s), if any, provided to the UE 500. The processor 410, and possibly the memory 411, in combination with the transceiver 415 (e.g., the wired transmitter 452 and/or the wireless transmitter 442 and the antenna 446) may comprise means for transmitting the positioning timeline information.

Implementations of the method 900 may include one or more of the following features. In an example implementation, the method 900 includes determining the positioning timeline information based on a particular processing capability of the user equipment, of the one or more indications of processing capability, that corresponds to the assistance data information. For example, the processor 410 may identify one processing capability from multiple processing capabilities indicated by the UE 500 by identifying the processing capability that corresponds to the assistance data transmitted to the UE 500. The positioning timeline unit 470 may determine the positioning timeline information based on the identified processing capability. The processor 410, possibly in combination with the memory 411, possibly in combination with the transceiver (e.g., the wireless receiver 444 and the antenna 446), may comprise means for determining the positioning timeline information. In another example implementation, determining the positioning timeline information comprises determining the particular processing capability based on a maximum frequency bandwidth indicated in the selected processing capability and a frequency bandwidth of the aggregated positioning reference signal. For example, if the UE 500 will be provided with EPRE, phase offset, RTD, and expected RTD, then the processor 410 may use the bandwidth of the aggregated PRS to be provided to the UE 500 to determine one of the processing-capability sets 638-640. The processor 410, possibly in combination with the memory 411, may comprise means for determining the particular processing capability of the user equipment.

Implementation Examples

Implementation examples are provided in the following numbered clauses.

1. A user equipment comprising:

at least one transceiver configured to transmit outbound signals wirelessly and receive inbound signals wirelessly;

a memory; and at least one processor, communicatively coupled to the at least one transceiver and the memory, and configured to:

send, to a network entity via the at least one transceiver, a processing-capability message indicating a processing capability of the user equipment for processing an aggregated positioning reference signal, wherein the processing-capability message corresponds to one or more assistance-data types;

obtain the aggregated positioning reference signal from the at least one transceiver; and process the aggregated positioning reference signal based on assistance data to determine a positioning signal measurement, the assistance data including the one or more assistance-data types.

2. The user equipment of clause 1, wherein the at least one processor is configured to send an assistance-data-type message to the network entity as part of the processing-capability message and including one or more indications of the one or more assistance-data types.

3. The user equipment of clause 1, wherein the at least one processor is configured to:
obtain the assistance data from the at least one transceiver;
select, based on the one or more assistance-data types of the assistance data, an algorithm of a plurality of algorithms; and
process the aggregated positioning reference signal in accordance with the algorithm, of the plurality of algorithms, using the assistance data to determine the positioning signal measurement.

4. The user equipment of clause 3, wherein the at least one processor is configured to select the algorithm, of the plurality of algorithms, based further on a frequency bandwidth of the aggregated positioning reference signal.

5. The user equipment of clause 1, wherein the at least one processor is configured to send the processing-capability message indicating one or more processing capability sets each corresponding to a respective indication of assistance-data availability.

6. The user equipment of clause 5, wherein each of the one or more processing capability sets includes a set of processing-capability parameters comprising a timeframe, a bandwidth, and a time duration of positioning reference signal symbols of the bandwidth that the at least one processor can process in the timeframe to determine the positioning signal measurement.

7. The user equipment of clause 1, wherein the at least one processor is configured to apply at least one assistance data parameter of the assistance data to each positioning reference signal resource of the aggregated positioning reference signal to determine the positioning signal measurement.

8. The user equipment of clause 1, wherein the at least one processor is configured to process the aggregated positioning reference signal according to a default algorithm to determine the positioning signal measurement in response to the assistance data being unavailable.

9. The user equipment of clause 1, wherein the at least one processor is configured to include a measurement accuracy as part of the processing capability in the processing-capability message.

10. The user equipment of clause 1, wherein the at least one processor is configured to receive the assistance data from the network entity via the at least one transceiver, and wherein at least a portion of the assistance data corresponds to the processing capability of the user equipment.

11. A user equipment comprising:
means for sending, to a network entity, a processing-capability message indicating a processing capability of the user equipment for processing an aggregated positioning reference signal, wherein the processing-capability message corresponds to one or more assistance-data types;
means for obtaining the aggregated positioning reference signal; and
means for processing the aggregated positioning reference signal based on assistance data to determine a positioning signal measurement, the assistance data including the one or more assistance-data types.

12. The user equipment of clause 11, wherein the means for sending the processing-capability message comprise means for sending the processing-capability message including an assistance-data-type message including one or more indications of the one or more assistance-data types.

13. The user equipment of clause 11, further comprising:
means for obtaining the assistance data; and
means for selecting, based on the one or more assistance-data types of the assistance data, an algorithm of a plurality of algorithms;
wherein the means for processing the aggregated positioning reference signal comprise means for processing the aggregated positioning reference signal in accordance with the algorithm, of the plurality of algorithms, using the assistance data to determine the positioning signal measurement.

14. The user equipment of clause 13, wherein the means for selecting comprise means for selecting the algorithm, of the plurality of algorithms, based further on a frequency bandwidth of the aggregated positioning reference signal.

15. The user equipment of clause 11, wherein the means for sending the processing-capability message comprise means for sending the processing-capability message indicating one or more processing capability sets each corresponding to a respective indication of assistance-data availability.

16. The user equipment of clause 15, wherein each of the one or more processing capability sets includes a set of processing-capability parameters comprising a timeframe, a bandwidth, and a time duration of positioning reference signal symbols of the bandwidth that the means for processing the aggregated positioning reference signal can process in the timeframe to determine the positioning signal measurement.

17. The user equipment of clause 11, wherein the means for processing the aggregated positioning reference signal comprise means for applying at least one assistance data parameter of the assistance data to each positioning reference signal resource of the aggregated positioning reference signal to determine the positioning signal measurement.

18. The user equipment of clause 11, wherein the means for processing the aggregated positioning reference signal comprise means for processing the aggregated positioning reference signal according to a default algorithm to determine the positioning signal measurement in response to the assistance data being unavailable.

19. The user equipment of clause 11, wherein the means for sending the processing-capability message comprise means for including a measurement accuracy as part of the processing capability in the processing-capability message.

20. The user equipment of clause 11, further comprising means for receiving the assistance data from the network entity, wherein at least a portion of the assistance data corresponds to the processing capability of the user equipment.

21. A method of determining a positioning signal measurement, the method comprising:
sending, from a user equipment to a network entity, a processing-capability message indicating a processing capability of the user equipment for processing an aggregated positioning reference signal, wherein the processing-capability message corresponds to one or more assistance-data types;
obtaining, at the user equipment, the aggregated positioning reference signal; and
processing, at the user equipment, the aggregated positioning reference signal based on assistance data to determine the positioning signal measurement, the assistance data including the one or more assistance-data types.

22. The method of clause 21, wherein sending the processing-capability message comprises sending an assistance-data-type message including one or more indications of the one or more assistance-data types.

23. The method of clause 21, further comprising:
obtaining the assistance data; and
selecting, based on the one or more assistance-data types of the assistance data, an algorithm of a plurality of algorithms;
wherein processing the aggregated positioning reference signal comprises processing the aggregated positioning reference signal in accordance with the algorithm, of the plurality of algorithms, using the assistance data to determine the positioning signal measurement.

24. The method of clause 23, wherein selecting the algorithm, of the plurality of algorithms, is based further on a frequency bandwidth of the aggregated positioning reference signal.

25. The method of clause 21, wherein the processing-capability message indicates one or more processing capability sets each corresponding to a respective indication of assistance-data availability.

26. The method of clause 25, wherein each of the one or more processing capability sets includes a set of processing-capability parameters comprising a timeframe, a bandwidth, and a time duration of positioning reference signal symbols of the bandwidth that the user equipment can process in the timeframe to determine the positioning signal measurement.

27. The method of clause 21, wherein processing the aggregated positioning reference signal comprises applying at least one assistance data parameter of the assistance data to each positioning reference signal resource of the aggregated positioning reference signal to determine the positioning signal measurement.

28. The method of clause 21, wherein the aggregated positioning reference signal is processed according to a default algorithm to determine the positioning signal measurement in response to the assistance data being unavailable.

29. The method of clause 21, wherein the processing-capability message includes a measurement accuracy.

30. The method of clause 21, further comprising receiving the assistance data at the user equipment from the network entity, wherein at least a portion of the assistance data corresponds to the processing capability of the user equipment.

31. A non-transitory, processor-readable storage medium comprising processor-readable instructions configured to cause one or more processors of a user equipment to:
send, from the user equipment to a network entity, a processing-capability message indicating a processing capability of the user equipment for processing an aggregated positioning reference signal, wherein the processing-capability message corresponds to one or more assistance-data types;
obtain, at the user equipment, the aggregated positioning reference signal; and
process, at the user equipment, the aggregated positioning reference signal based on assistance data to determine a positioning signal measurement, the assistance data including the one or more assistance-data types.

32. The storage medium of clause 31, wherein the processor-readable instructions configured to cause the one or more processors to send the processing-capability message comprise processor-readable instructions configured to cause the one or more processors to send an assistance-data-type message including one or more indications of the one or more assistance-data types.

33. The storage medium of clause 31, further comprising instructions configured to cause the one or more processors to:
obtain the assistance data; and
select, based on the one or more assistance-data types of the assistance data, an algorithm of a plurality of algorithms;
wherein the processor-readable the instructions configured to cause the one or more processors to process the aggregated positioning reference signal comprise processor-readable instructions configured to cause the one or more processors to process the aggregated positioning reference signal in accordance with the algorithm, of the plurality of algorithms, using the assistance data to determine the positioning signal measurement.

34. The storage medium of clause 33, wherein the processor-readable instructions configured to cause the one or more processors to select the algorithm, of the plurality of algorithms, comprise processor-readable instructions configured to cause the one or more processors to select the algorithm, of the plurality of algorithms, based further on a frequency bandwidth of the aggregated positioning reference signal.

35. The storage medium of clause 31, wherein the processing-capability message indicates one or more processing capability sets each corresponding to a respective indication of assistance-data availability.

36. The storage medium of clause 35, wherein each of the one or more processing capability sets includes a set of a processing-capability parameters comprising a timeframe, a bandwidth, and a time duration of positioning reference signal symbols of the bandwidth that the one or more processors can process in the timeframe to determine the positioning signal measurement.

37. The storage medium of clause 31, wherein the processor-readable instructions configured to cause the one or more processors to process the aggregated positioning reference signal comprise processor-readable instructions configured to cause the one or more processors to apply at least one assistance data parameter of the assistance data to each positioning reference signal resource of the aggregated positioning reference signal to determine the positioning signal measurement.

38. The storage medium of clause 31, wherein the processor-readable instructions configured to cause the one or more processors to process the aggregated positioning reference signal comprise processor-readable instructions configured to cause the one or more processors to process the aggregated positioning reference signal according to a default algorithm to determine the positioning signal measurement in response to the assistance data being unavailable.

39. The storage medium of clause 31, wherein the processing-capability message includes a measurement accuracy.

40. The storage medium of clause 31, further comprising processor-readable instructions configured to cause the one or more processors to receive the assistance data from the network entity, wherein at least a portion of the assistance data corresponds to the processing capability of the user equipment.

41. A location server comprising:
at least one transceiver;
a memory; and
at least one processor, communicatively coupled to the at least one transceiver and the memory, and configured to:
receive, via the at least one transceiver, a processing-capability message including one or more indications of processing capability of a user equipment for processing an aggregated positioning reference signal, wherein each of the one or more indications of processing capability corresponds to a respective indication of one or more assistance-data types; and transmit, via the at least one transceiver to the user equipment, assistance data information based on the processing-capability message.

42. The location server of clause 41, wherein the at least one processor is further configured to transmit, via the at least one transceiver to the user equipment, positioning timeline information based on the assistance data information.

43. The location server of clause 42, wherein the at least one processor is configured to determine the positioning timeline information based on a particular processing capability of the user equipment, of the one or more indications of processing capability, that corresponds to the assistance data information.

44. The location server of clause 43, wherein the at least one processor is configured to determine the particular processing capability of the user equipment based on a maximum frequency bandwidth of the particular processing capability and a frequency bandwidth of the aggregated positioning reference signal.

45. A location server comprising:
means for receiving a processing-capability message including one or more indications of processing capability of a user equipment for processing an aggregated positioning reference signal, wherein each of the one or more indications of processing capability corresponds to a respective indication of one or more assistance-data types; and means for transmitting, to the user equipment, assistance data information based on the processing-capability message.

46. The location server of clause 45, further comprising means for transmitting, to the user equipment, positioning timeline information based on the assistance data information.

47. The location server of clause 46, further comprising means for determining the positioning timeline information based on a particular processing capability of the user equipment, of the one or more indications of processing capability, that corresponds to the assistance data information.

48. The location server of clause 47, wherein the means for determining the positioning timeline information comprise means for determining the particular processing capability of the user equipment based on a maximum frequency bandwidth of the particular processing capability and a frequency bandwidth of the aggregated positioning reference signal.

49. A method for assisting a user equipment, the method comprising:
receiving, at a location server from the user equipment, a processing-capability message including one or more indications of processing capability of the user equipment for processing an aggregated positioning reference signal, wherein each of the one or more indications of processing capability corresponds to a respective indication of one or more assistance-data types; and transmitting, from the location server to the user equipment, assistance data information based on the processing-capability message.

50. The method of clause 49, further comprising transmitting, from the location server to the user equipment, positioning timeline information based on the assistance data information.

51. The method of clause 50, further comprising determining the positioning timeline information based on a particular processing capability of the user equipment, of the one or more indications of processing capability, that corresponds to the assistance data information.

52. The method of clause 51, wherein determining the positioning timeline information comprises determining the particular processing capability of the user equipment based on a maximum frequency bandwidth indicated in the particular processing capability and a frequency bandwidth of the aggregated positioning reference signal.

53. A non-transitory, processor-readable storage medium comprising processor-readable instructions configured to cause one or more processors of a location server to:
receive, from a user equipment, a processing-capability message including one or more indications of processing capability of the user equipment for processing an aggregated positioning reference signal, wherein each of the one or more indications of processing capability corresponds to a respective indication of one or more first assistance-data types; and transmit, to the user equipment, assistance data information based on the processing-capability message.

54. The storage medium of clause 53, further comprising processor-readable instructions configured to cause the one or more processors to transmit, to the user equipment, positioning timeline information based on the assistance data information.

55. The storage medium of clause 54, further comprising processor-readable instructions configured to cause the one or more processors to determine the positioning timeline information based on a particular processing capability of the user equipment, of the one or more indications of processing capability, that corresponds to the assistance data information.

56. The storage medium of clause 55, wherein the processor-readable instructions configured to cause the one or more processors to determine the positioning timeline information comprise processor-readable instructions configured to cause the one or more processors to determine the particular processing capability of the user equipment based on a maximum frequency bandwidth of the particular processing capability and a frequency bandwidth of the aggregated positioning reference signal.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. A statement that a feature implements, or a statement that a feature may implement, a function includes that the feature may be configured to implement the function (e.g., a statement that an item performs, or a statement that the item may perform, function X includes that the item may be configured to perform function X). Elements discussed may be components of a larger system. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
   at least one transceiver configured to transmit outbound signals wirelessly and receive inbound signals wirelessly;
   a memory; and
   at least one processor, communicatively coupled to the at least one transceiver and the memory, and configured to:
   send, to a network entity via the at least one transceiver, a processing-capability message indicating a processing capability of the user equipment for processing an aggregated positioning reference signal comprising a plurality of positioning reference signal resources, wherein the processing-capability message corresponds to one or more assistance-data types;
   obtain the aggregated positioning reference signal from the at least one transceiver; and
   process the aggregated positioning reference signal based on assistance data to determine a positioning signal measurement, the assistance data including the one or more assistance-data types.

2. The user equipment of claim 1, wherein the at least one processor is configured to send an assistance-data-type message to the network entity as part of the processing-capability message and including one or more indications of the one or more assistance-data types.

3. The user equipment of claim 1, wherein the at least one processor is configured to send the processing-capability message indicating one or more processing capability sets each corresponding to a respective indication of assistance-data availability.

4. The user equipment of claim 1, wherein the at least one processor is configured to apply at least one assistance data parameter of the assistance data to each positioning reference signal resource of the aggregated positioning reference signal to determine the positioning signal measurement.

5. The user equipment of claim 1, wherein the at least one processor is configured to include a measurement accuracy as part of the processing capability in the processing-capability message.

6. The user equipment of claim 1, wherein the at least one processor is configured to receive the assistance data from the network entity via the at least one transceiver, and wherein at least a portion of the assistance data corresponds to the processing capability of the user equipment.

7. A user equipment comprising:
   at least one transceiver configured to transmit outbound signals wirelessly and receive inbound signals wirelessly;
   a memory; and
   at least one processor, communicatively coupled to the at least one transceiver and the memory, and configured to:
   send, to a network entity via the at least one transceiver, a processing-capability message indicating a processing capability of the user equipment for processing an aggregated positioning reference signal, wherein the processing-capability message corresponds to one or more assistance-data types;
   obtain the aggregated positioning reference signal from the at least one transceiver;
   obtain assistance data from the at least one transceiver, the assistance data including the one or more assistance-data types;
   select, based on the one or more assistance-data types of the assistance data, an algorithm of a plurality of algorithms; and
   process the aggregated positioning reference signal in accordance with the algorithm, of the plurality of algorithms, using the assistance data to determine a positioning signal measurement.

8. The user equipment of claim 7, wherein the at least one processor is configured to select the algorithm, of the plurality of algorithms, based further on a frequency bandwidth of the aggregated positioning reference signal.

9. A user equipment comprising:
   at least one transceiver configured to transmit outbound signals wirelessly and receive inbound signals wirelessly;
   a memory; and
   at least one processor, communicatively coupled to the at least one transceiver and the memory, and configured to:
   send, to a network entity via the at least one transceiver, a processing-capability message indicating a processing capability of the user equipment for processing an aggregated positioning reference signal, wherein the processing-capability message corresponds to one or more assistance-data types;
   obtain the aggregated positioning reference signal from the at least one transceiver; and
   process the aggregated positioning reference signal based on assistance data to determine a positioning signal measurement, the assistance data including the one or more assistance-data types;
   wherein the at least one processor is configured to send the processing-capability message indicating one or more processing capability sets each corresponding to a respective indication of assistance-data availability; and
   wherein each of the one or more processing capability sets includes a set of processing-capability parameters comprising a timeframe, a bandwidth, and a time duration of positioning reference signal symbols of the bandwidth that the at least one processor can process in the timeframe to determine the positioning signal measurement.

10. A user equipment comprising:
    at least one transceiver configured to transmit outbound signals wirelessly and receive inbound signals wirelessly;
    a memory; and
    at least one processor, communicatively coupled to the at least one transceiver and the memory, and configured to:
    send, to a network entity via the at least one transceiver, a processing-capability message indicating a processing capability of the user equipment for processing an aggregated positioning reference signal, wherein the processing-capability message corresponds to one or more assistance-data types;

obtain the aggregated positioning reference signal from the at least one transceiver; and process the aggregated positioning reference signal based on assistance data to determine a positioning signal measurement, the assistance data including the one or more assistance-data types;

wherein the at least one processor is configured to process the aggregated positioning reference signal according to a default algorithm to determine the positioning signal measurement in response to the assistance data being unavailable.

11. A user equipment comprising:

means for sending, to a network entity, a processing-capability message indicating a processing capability of the user equipment for processing an aggregated positioning reference signal comprising a plurality of positioning reference signal resources, wherein the processing-capability message corresponds to one or more assistance-data types;

means for obtaining the aggregated positioning reference signal; and means for processing the aggregated positioning reference signal based on assistance data to determine a positioning signal measurement, the assistance data including the one or more assistance-data types.

12. The user equipment of claim 11, wherein the means for sending the processing-capability message comprise means for sending the processing-capability message including an assistance-data-type message including one or more indications of the one or more assistance-data types.

13. The user equipment of claim 11, further comprising:

means for obtaining the assistance data; and means for selecting, based on the one or more assistance-data types of the assistance data, an algorithm of a plurality of algorithms;

wherein the means for processing the aggregated positioning reference signal comprise means for processing the aggregated positioning reference signal in accordance with the algorithm, of the plurality of algorithms, using the assistance data to determine the positioning signal measurement.

14. The user equipment of claim 13, wherein the means for selecting comprise means for selecting the algorithm, of the plurality of algorithms, based further on a frequency bandwidth of the aggregated positioning reference signal.

15. The user equipment of claim 11, wherein the means for sending the processing-capability message comprise means for sending the processing-capability message indicating one or more processing capability sets each corresponding to a respective indication of assistance-data availability.

16. The user equipment of claim 15, wherein each of the one or more processing capability sets includes a set of processing-capability parameters comprising a timeframe, a bandwidth, and a time duration of positioning reference signal symbols of the bandwidth that the means for processing the aggregated positioning reference signal can process in the timeframe to determine the positioning signal measurement.

17. The user equipment of claim 11, wherein the means for processing the aggregated positioning reference signal comprise means for applying at least one assistance data parameter of the assistance data to each positioning reference signal resource of the aggregated positioning reference signal to determine the positioning signal measurement.

18. The user equipment of claim 11, wherein the means for processing the aggregated positioning reference signal comprise means for processing the aggregated positioning reference signal according to a default algorithm to determine the positioning signal measurement in response to the assistance data being unavailable.

19. The user equipment of claim 11, wherein the means for sending the processing-capability message comprise means for including a measurement accuracy as part of the processing capability in the processing-capability message.

20. The user equipment of claim 11, further comprising means for receiving the assistance data from the network entity, wherein at least a portion of the assistance data corresponds to the processing capability of the user equipment.

21. A method of determining a positioning signal measurement, the method comprising:

sending, from a user equipment to a network entity, a processing-capability message indicating a processing capability of the user equipment for processing an aggregated positioning reference signal comprising a plurality of positioning reference signal resources, wherein the processing-capability message corresponds to one or more assistance-data types;

obtaining, at the user equipment, the aggregated positioning reference signal; and processing, at the user equipment, the aggregated positioning reference signal based on assistance data to determine the positioning signal measurement, the assistance data including the one or more assistance-data types.

22. The method of claim 21, wherein sending the processing-capability message comprises sending an assistance-data-type message including one or more indications of the one or more assistance-data types.

23. The method of claim 21, wherein the processing-capability message indicates one or more processing capability sets each corresponding to a respective indication of assistance-data availability.

24. The method of claim 21, wherein processing the aggregated positioning reference signal comprises applying at least one assistance data parameter of the assistance data to each positioning reference signal resource of the aggregated positioning reference signal to determine the positioning signal measurement.

25. The method of claim 21, wherein the processing-capability message includes a measurement accuracy.

26. The method of claim 21, further comprising receiving the assistance data at the user equipment from the network entity, wherein at least a portion of the assistance data corresponds to the processing capability of the user equipment.

27. A method of determining a positioning signal measurement, the method comprising:

sending, from a user equipment to a network entity, a processing-capability message indicating a processing capability of the user equipment for processing an aggregated positioning reference signal, wherein the processing-capability message corresponds to one or more assistance-data types;

obtaining, at the user equipment, the aggregated positioning reference signal;

obtaining assistance data including the one or more assistance-data types; and selecting, based on the one or more assistance-data types of the assistance data, an algorithm of a plurality of algorithms; and processing the aggregated positioning reference signal in accordance with the algorithm, of the plurality of algorithms, using the assistance data to determine the g positioning signal measurement.

28. The method of claim 27, wherein selecting the algorithm, of the plurality of algorithms, is based further on a frequency bandwidth of the aggregated positioning reference signal.

29. A method of determining a positioning signal measurement, the method comprising:
sending, from a user equipment to a network entity, a processing-capability message indicating a processing capability of the user equipment for processing an aggregated positioning reference signal, wherein the processing-capability message corresponds to one or more assistance-data types;
obtaining, at the user equipment, the aggregated positioning reference signal; and
processing, at the user equipment, the aggregated positioning reference signal based on assistance data to determine the positioning signal measurement, the assistance data including the one or more assistance-data types;
wherein the processing-capability message indicates one or more processing capability sets each corresponding to a respective indication of assistance-data availability; and
wherein each of the one or more processing capability sets includes a set of processing-capability parameters comprising a timeframe, a bandwidth, and a time duration of positioning reference signal symbols of the bandwidth that the user equipment can process in the timeframe to determine the positioning signal measurement.

30. A method of determining a positioning signal measurement, the method comprising:
sending, from a user equipment to a network entity, a processing-capability message indicating a processing capability of the user equipment for processing an aggregated positioning reference signal, wherein the processing-capability message corresponds to one or more assistance-data types;
obtaining, at the user equipment, the aggregated positioning reference signal; and
processing, at the user equipment, the aggregated positioning reference signal based on assistance data to determine the positioning signal measurement, the assistance data including the one or more assistance-data types;
wherein the aggregated positioning reference signal is processed according to a default algorithm to determine the positioning signal measurement in response to the assistance data being unavailable.

31. A location server comprising:
at least one transceiver;
a memory; and
at least one processor, communicatively coupled to the at least one transceiver and the memory, and configured to:
receive, via the at least one transceiver, a processing-capability message including one or more indications of processing capability of a user equipment for processing an aggregated positioning reference signal comprising a plurality of positioning reference signal resources, wherein each of the one or more indications of processing capability corresponds to a respective indication of one or more assistance-data types; and
transmit, via the at least one transceiver to the user equipment, assistance data information based on the processing-capability message.

32. The location server of claim 31, wherein the at least one processor is further configured to transmit, via the at least one transceiver to the user equipment, positioning timeline information based on the assistance data information.

33. The location server of claim 32, wherein the at least one processor is configured to determine the positioning timeline information based on a particular processing capability of the user equipment, of the one or more indications of processing capability, that corresponds to the assistance data information.

34. The location server of claim 33, wherein the at least one processor is configured to determine the particular processing capability of the user equipment based on a maximum frequency bandwidth of the particular processing capability and a frequency bandwidth of the aggregated positioning reference signal.

35. A location server comprising:
means for receiving a processing-capability message including one or more indications of processing capability of a user equipment for processing an aggregated positioning reference signal comprising a plurality of positioning reference signal resources, wherein each of the one or more indications of processing capability corresponds to a respective indication of one or more assistance-data types; and
means for transmitting, to the user equipment, assistance data information based on the processing-capability message.

36. The location server of claim 35, further comprising means for transmitting, to the user equipment, positioning timeline information based on the assistance data information.

37. The location server of claim 36, further comprising means for determining the positioning timeline information based on a particular processing capability of the user equipment, of the one or more indications of processing capability, that corresponds to the assistance data information.

38. The location server of claim 37, wherein the means for determining the positioning timeline information comprise means for determining the particular processing capability of the user equipment based on a maximum frequency bandwidth of the particular processing capability and a frequency bandwidth of the aggregated positioning reference signal.

39. A method for assisting a user equipment, the method comprising:
receiving, at a location server from the user equipment, a processing-capability message including one or more indications of processing capability of the user equipment for processing an aggregated positioning reference signal comprising a plurality of positioning reference signal resources, wherein each of the one or more indications of processing capability corresponds to a respective indication of one or more assistance-data types; and
transmitting, from the location server to the user equipment, assistance data information based on the processing-capability message.

40. The method of claim 39, further comprising transmitting, from the location server to the user equipment, positioning timeline information based on the assistance data information.

41. The method of claim 40, further comprising determining the positioning timeline information based on a particular processing capability of the user equipment, of the one or more indications of processing capability, that corresponds to the assistance data information.

42. The method of claim 41, wherein determining the positioning timeline information comprises determining the particular processing capability of the user equipment based on a maximum frequency bandwidth indicated in the particular processing capability and a frequency bandwidth of the aggregated positioning reference signal.

* * * * *